US008437253B2

(12) United States Patent
Charny et al.

(10) Patent No.: US 8,437,253 B2
(45) Date of Patent: May 7, 2013

(54) CONTROL OF PREEMPTION-BASED BEAT-DOWN EFFECT

(75) Inventors: Anna Charny, Sudbury, MA (US); Francois Le Faucheur, Valbonne (FR)

(73) Assignee: Cisco Technology, Inc., San Jose, CA (US)

( * ) Notice: Subject to any disclaimer, the term of this patent is extended or adjusted under 35 U.S.C. 154(b) by 337 days.

(21) Appl. No.: 12/791,476

(22) Filed: Jun. 1, 2010

(65) Prior Publication Data

US 2010/0235538 A1    Sep. 16, 2010

Related U.S. Application Data

(62) Division of application No. 11/606,415, filed on Nov. 30, 2006, now Pat. No. 7,742,416.

(51) Int. Cl.
*G01R 31/08* (2006.01)

(52) U.S. Cl.
USPC .......................................................... 370/230

(58) Field of Classification Search ............... 370/229, 370/230
See application file for complete search history.

(56) References Cited

U.S. PATENT DOCUMENTS

| | | | |
|---|---|---|---|
| 5,812,527 A | 9/1998 | Kline et al. | |
| 6,069,872 A * | 5/2000 | Bonomi et al. | 370/236 |
| 6,356,629 B1 | 3/2002 | Fourie et al. | |
| 6,359,863 B1 | 3/2002 | Varma et al. | |
| 6,424,624 B1 | 7/2002 | Galand et al. | |
| 6,633,585 B1 | 10/2003 | Ghanwani et al. | |
| 6,674,755 B1 | 1/2004 | Potter et al. | |
| 6,822,940 B1 | 11/2004 | Zavalkovsky et al. | |
| 6,967,923 B1 | 11/2005 | Fang | |
| 7,020,090 B2 | 3/2006 | Chandwadkar et al. | |
| 7,143,006 B2 | 11/2006 | Ma et al. | |
| 2004/0215820 A1 | 10/2004 | Blair | |

OTHER PUBLICATIONS

Bader, et al., "RMD-QOSM—The Resource Management in Diffserv QOS Model (draft-ietf-nsis-rmd-07.txt)", NSIS Working Group, Internet Draft, Jun. 23, 2006, pp. 1-82, IETF.

* cited by examiner

*Primary Examiner* — Sai-Ming Chan
(74) *Attorney, Agent, or Firm* — Cesari and McKenna, LLP

(57) ABSTRACT

In one embodiment, a node determines an overload ratio for an output as a ratio of a total rate of received traffic at the output to a preemption threshold of the output. The node also determines a ratio of traffic that is to be marked at the output based on the overload ratio and a ratio of previously marked traffic destined for the output from each input to the total traffic from each input to the output, and whether, for a particular input, the ratio of previously marked traffic is less than the ratio of traffic that is to be marked at the output. If so, the node marks unmarked traffic of the particular input corresponding to a difference between the ratio of traffic that is to be marked at the output and the ratio of previously marked traffic destined for the output from the particular input.

20 Claims, 7 Drawing Sheets

CONTROL OF PREEMPTION-BASED BEAT-DOWN EFFECT

RELATED APPLICATIONS

This Application for United States patent is a divisional of U.S. patent application Ser. No. 11/606,415, filed on Nov. 30, 2006 by Anna Charny and Francois Le Faucheur, and entitled "Control of Preemption-Based Beat-Down Effect", which is incorporated by reference herein in its entirety.

TECHNICAL FIELD

The present disclosure relates generally to computer networks, and, more particularly, to flow control and preemption.

BACKGROUND

Various admission control mechanisms (e.g., call admission control, CAC) may be used within a computer network to control the amount of traffic traversing network elements (links/nodes). For example, service providers may limit the number of end-to-end data flows (e.g., Voice over Internet Protocol, VoIP calls) in order to prevent over-burdening the network, potentially leading to network congestion. Generally, admission control may occur at the edges of a service provider's network (e.g., edge-to-edge admission control in a core network) based on the status of the nodes within the network, and may either admit or deny a data flow use of the network, sometimes along a particular selected (admitted) path. Changes in the network, however, such as due to failures, reroutes, etc., may allow data flows to bypass admission control, since the flows are no longer on their originally admitted paths. Also, "flash crowds" (where many new flows are created at substantially the same time) may overburden the network resources, such that admission control may not be able to effectively manage the number of new flows. Because of these reasons, some links and nodes within the network may become congested. (Notably, congestion, as used herein, implies that a link or node in the network is receiving more traffic than a configurable threshold up to a maximum amount of traffic the link or node can handle.)

Generally, all flows sharing a congested network element become affected and suffer potentially substantial Quality of Service (QoS) degradation due to conventional per-packet control, such as dropping individual packets (from all flows) in order to relieve congestion. If the flows are voice flows, then potentially all users may "hang up" if the QoS degradation lasts longer than a few seconds. It is often desirable, therefore, to selectively "preempt" (drop/deny admission for) certain flows to alleviate congestion, and restore the necessary level of QoS for the non-preempted flows. For example, low precedence calls may be preempted to allow higher precedence calls to remain; however the precedence level of calls is not always available (e.g., due to security/encapsulation, etc.), thus limiting the use of such selective preemption. Some flow control networks, therefore, perform per-packet processing within the network to determine whether congestion exists, and mark packets that are received at a rate faster than the receiving node can forward over the desired path (or, notably, greater than a "preemption threshold" to prevent reaching the maximum physical rate). Information/feedback about the number of marked packets may be used (e.g., by an ingress node originating the data flows into the core network) to determine how many/which flows to preempt based on the network conditions.

One example solution that attempts to alleviate the occurrence of congestion within the network is described with a Resource Management in DiffServ (RMD) concept in an Internet Draft by Bader, et al., entitled *RMD-QOSM—The Resource Management in DiffServ QOS Model<draft-ietf-nsis-rmd-07.txt>*, dated June 2006, which is hereby incorporated by reference in its entirety. As described therein, the rate at which flows enter an output queue of a network node is measured such that a degree of overload may be computed. Packets may then be marked so that a number of marked packets leaving the output of the node is proportional to the degree of overload computed. For example, assuming a 10% overload is observed, then 10% of the previously unmarked traffic is marked at the output of the queue. The egress node of the network computes an overall degree of overload and informs the ingress node, which may then preempt any necessary traffic flows.

Yet, there are circumstances where the above solutions may preempt too many flows based on the feedback received. For instance, when there are multiple network elements that are congested within a network, packets from flows may be marked at multiple locations. In this manner, when feedback is returned to the flow control node (e.g., ingress node), the markings reflect congestion that may be worse than what actually exists in the network, and the flow control node may consequently preempt more flows than necessary to alleviate the actual congestion (i.e., the flows have been "beat-down"). For rate-adaptive flows, the beat-down problem is reduced since aggressively reduced (beat-down) rates may be dynamically increased as part of normal rate adaptation. However, in is the context of preemption (dropping/denying entire flows), once a flow is preempted, it is no longer operational within the network, and may not return. It is therefore undesirable to beat down flows in a network based on inefficiently marked packets, particularly where preempting only a certain number of flows would alleviate congestion while allowing a greater number of flows to maintain their connectivity and QoS levels.

BRIEF DESCRIPTION OF THE DRAWINGS

The above and further advantages of the invention may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
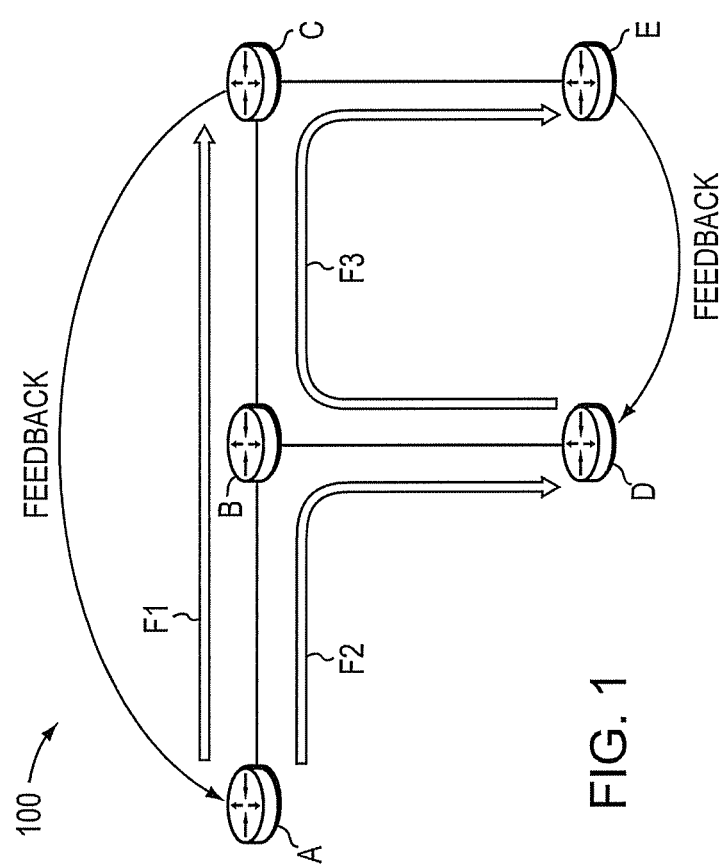
FIG. 1 illustrates an example computer network.

According to a first embodiment of the disclosure, a node determines an overload ratio ("OVERLOAD") for an output thereof as a ratio of a total rate of received traffic at the output to a preemption threshold of the output, and a ratio of traffic that is to be is marked at the output ("NEED_RATIO") accordingly as 1-1/OVERLOAD. The node also determines a ratio of previously marked traffic destined for the output from each input feeding the output to the total traffic from each input to the output ("MARKED_RATIO"). If, for a particular input, MARKED_RATIO is less than NEED_RATIO, the node marks unmarked traffic of that particular input corresponding to a ratio substantially equal to the difference between NEED_RATIO and MARKED_RATIO for that particular input.

Also, according to a second embodiment of the disclosure, a node first determines a fair share of an output for one or more inputs that feed the output based on an overall preemption threshold of the output divided by a number of the inputs. The node also determines a rate of unmarked traffic that is received on each of the inputs, and further determines which inputs have a rate of unmarked traffic that is less than or equal to the fair share for the output ("constrained inputs"). In addition, the node determines which inputs have a rate of unmarked traffic that is greater than the fair share for the output ("unconstrained inputs"). The node may further determine remaining available bandwidth for all unconstrained inputs by subtracting a combined rate of unmarked traffic for each constrained input from the overall preemption threshold. From this, the node may determine a fair share use of the output for the unconstrained inputs ("unconstrained fair share") based on the remaining available bandwidth divided by a number of the remaining unconstrained inputs. The node may continue to perform iterations of this to determine additional constrained inputs based on updated unconstrained fair shares. If no more inputs have become unconstrained, the iterations complete. Otherwise, the node further determines a new remaining available bandwidth by subtracting the combined rate of unmarked traffic of all inputs that were determined to be constrained at this iteration from the previous value of the remaining available bandwidth, removing these constrained inputs from the set of unconstrained inputs, and repeating the new iteration of the computation of the unconstrained fair share of the updated remaining available bandwidth for the remaining unconstrained inputs. Once the iterations are complete, the node may then mark unmarked traffic of each unconstrained input at a rate substantially equal to the rate of unmarked traffic greater than the unconstrained fair share. No additional marking is needed for all inputs that have been determined to be constrained.

DESCRIPTION

A computer network is a geographically distributed collection of nodes interconnected by communication links and segments for transporting data between end nodes, such as personal computers and workstations. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Since management of interconnected computer networks can prove burdensome, smaller groups of computer networks may be maintained as routing domains or autonomous systems. The networks within an autonomous system (AS) are typically coupled together by conventional "intradomain" routers configured to execute intradomain routing protocols, and are generally subject to a common authority. To improve routing scalability, a service provider (e.g., an ISP) may divide an AS into multiple "areas" or "levels." It may be desirable, however, to increase the number of nodes capable of exchanging data; in this case, interdomain routers executing interdomain routing protocols are used to interconnect nodes of the various ASes. Moreover, it may be desirable to interconnect various ASes that operate under different administrative domains. As used herein, an AS, area, or level is generally referred to as a "domain."

FIG. 1 is a schematic block diagram of an example computer network 100 illustratively comprising nodes (e.g., routers) A-E interconnected by links as shown. Those skilled in the art will understand that any number of nodes, routers, links, etc. may be used in the computer network, and that the view shown herein is for simplicity. Those skilled in the art will also understand that while the present invention is described generally, it may apply to any network configuration within an AS or area, or throughout multiple ASes or areas, etc. Illustratively, nodes A-E may comprise a provider core network, such as, for example, where nodes A and C-E are provider edge (PE) devices, and node B is a core router. Illustratively, sets of data flows F1-F3 (described below) may each have an ingress into the network 100 and an egress out of the network. For instance, node A may be an ingress for flows of F1 and F2, node C may be an egress for flows of F1, node D may be an egress for flows of F2 and an ingress for flows of F3, and node E may be an egress for flows of F3. Data packets (e.g., within the flows) may be exchanged among the nodes of the computer network 100 using predefined network communication protocols such as the Transmission Control Protocol/Internet Protocol (TCP/IP), User Datagram Protocol (UDP), Asynchronous Transfer Mode (ATM) protocol, Frame Relay protocol, Internet Packet Exchange (IPX) protocol, etc.

Figure 2:
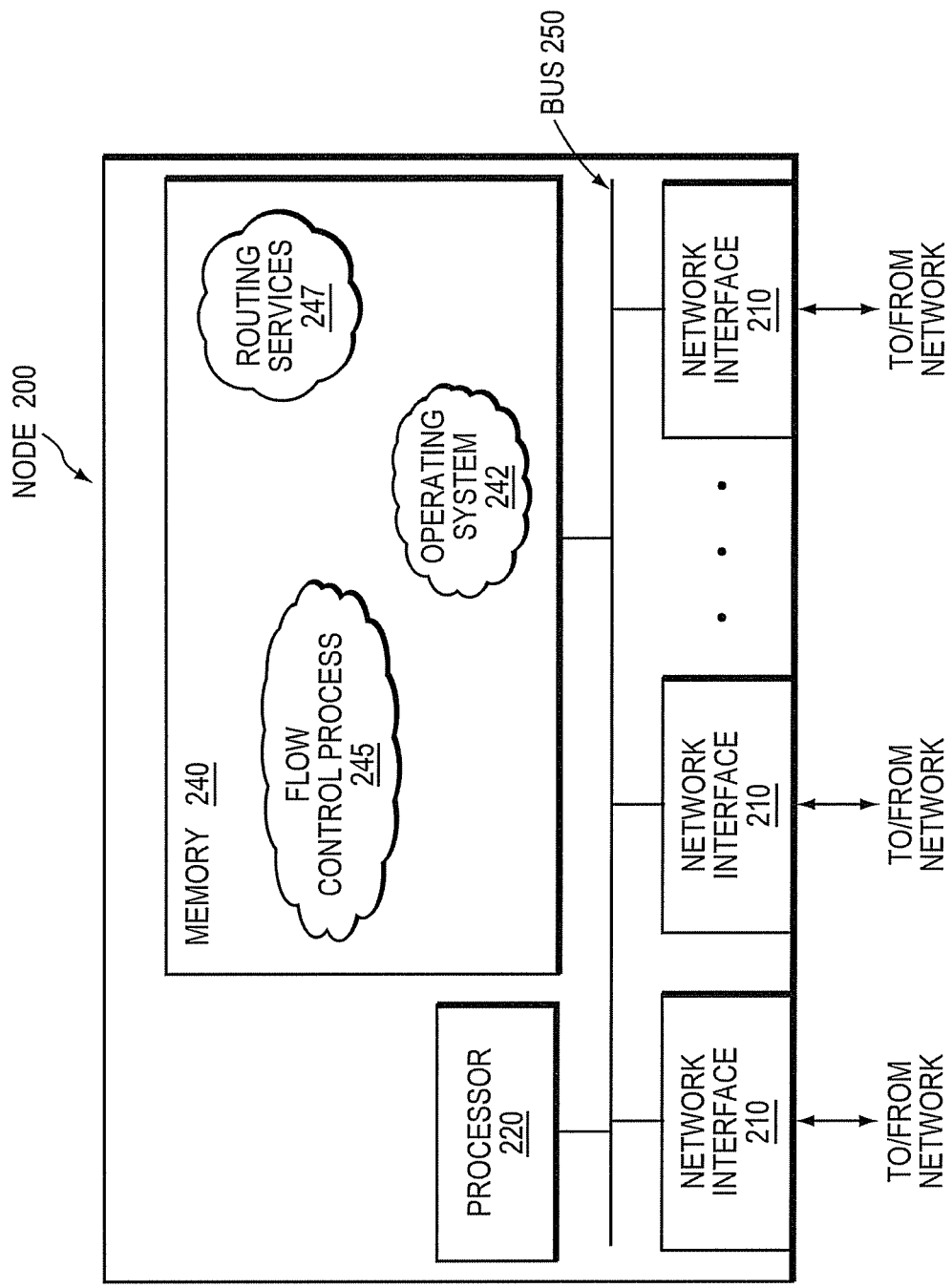
FIG. 2 illustrates an example network device/node.

FIG. 2 is a schematic block diagram of an example node/router 200 that may be advantageously used with one or more embodiments described herein, e.g., as a flow control participating node (for example, nodes A-C above). The node comprises a plurality of network interfaces 210, a processor 220, and a memory 240 interconnected by a system bus 250. The network interfaces 210 contain the mechanical, electrical and signaling is circuitry for communicating data over physical links coupled to the network 100. The network interfaces may be configured to transmit and/or receive data using a variety of different communication protocols, including, inter alia, TCP/IP, UDP, ATM, synchronous optical networks (SONET), wireless protocols, Frame Relay, Ethernet, Fiber Distributed Data Interface (FDDI), etc. Notably, a physical network interface 210 may also be used to implement one or more virtual network interfaces, such as for Virtual Private Network (VPN) access, known to those skilled in the art.

The memory 240 comprises a plurality of storage locations that are addressable by the processor 220 and the network interfaces 210 for storing software programs and data structures associated with the present invention. The processor 220 may comprise necessary elements or logic adapted to execute the software programs and manipulate the data structures. An operating system 242 (e.g., the Internetworking Operating System, or IOS™, of Cisco Systems, Inc.), portions of which are typically resident in memory 240 and executed by the processor, functionally organizes the node by, inter alia, invoking network operations in support of software processes and/or services executing on the router. These software processes and/or services may comprise routing services 247 and flow control process/services 245, described herein. It will be apparent to those skilled in the art that other processor and memory means, including various computer-readable media, may be used to store and execute program instructions pertaining to the inventive technique described herein.

Routing services 247 contain computer executable instructions executed by processor 220 to perform functions provided by one or more routing protocols, such as the Interior Gateway Protocol (IGP) (e.g., Open Shortest Path First, "OSPF," and Intermediate-System-to-Intermediate-System, "IS-IS"), the Border Gateway Protocol (BGP), etc., as will be understood by those skilled in the art. These functions may be configured to manage a forwarding information database (not shown) containing, e.g., data used to make forwarding decisions. In particular, changes in the network topology may be communicated among routers 200 using routing protocols, such as the conventional OSPF and IS-IS link-state protocols (e.g., to "converge" to an identical view of the network topology). Notably, routing services 247 may also perform functions related to virtual routing protocols, such as maintaining VRF instances (not shown), or tunneling protocols, such as for Multi-Protocol Label Switching, etc., each as will be understood by those skilled in the art.

Figure 3:
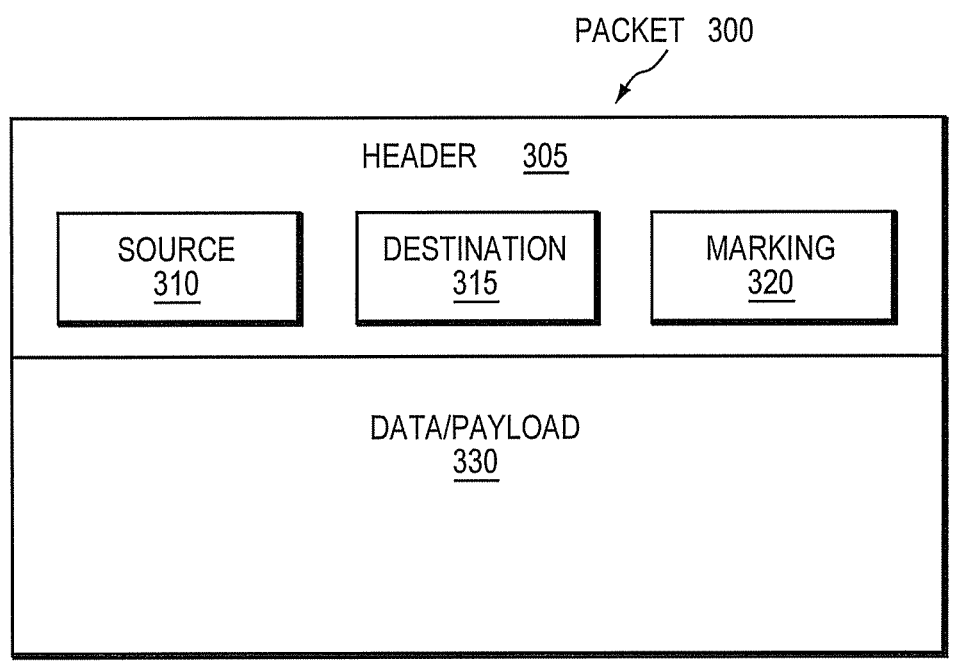
FIG. 3 illustrates an example packet.

FIG. 3 is a schematic block diagram of an example packet 300 that may be used in accordance with one or more embodiments described herein. Packet 300 may comprise a conventional header information field 305, such as an IP header and/or other suitable encapsulation protocol header, as will be understood by those skilled in the art. Source address field 310 contains the originating address of the packet, and destination address field 315 contains the address of the packet's destination. A packet marking field 320 may contain an indication of whether the packet is "marked" for one or more reasons, such as those described here. For example, a packet may be marked by one node, e.g., using one or more flags/bits/values within marking field 320, and another node may read the packet marking in order to make various decisions based on the packet markings, as will be understood by those skilled in the art. Notably, as used herein, a marked packet may be referred to as a packet 300', while an unmarked packet or a packet generally (marked or unmarked) may be referred to simply as a packet 300. Also, data/payload field 330 contains the payload data of the packet, generally relevant to the source and destination of the packet 300.

A set of packets traversing a path through a network between a source and a destination for a particular application may generally define a data flow, such as, e.g., a VoIP call from a sender to a receiver. The flow may traverse the network using a transmission protocol, such as IP, ATM, tunneling/encapsulation, etc., as will be understood by those skilled in the art. There are occasions, however, when too many flows traverse one or more network elements (nodes/links), resulting in congestion, as described above. Prior solutions to alleviate congestion may lead to excessive feedback accumulation over multiple points of congestion through the network, thus resulting in a beat-down problem, where more flows are preempted than necessary to alleviate congestion. In other words, these prior solutions fail to account for traffic already marked at previous congestion points, which, for example, may lead to potentially too much marked traffic at a merge point, and potentially too little marked traffic at a diverge point.

As an example of a beat-down problem, suppose that a set of flows traverses two congested links. The first link has an overload equal to twice as much as the link can support ("2×" overload), so 50% of the traffic going to the second link is marked. The second link (e.g., having the same capacity as the first one) also has 2× overload, so ideally it also needs to have 50% of the traffic marked at its output. However, since the marking scheme generally measures both marked and unmarked traffic, it concludes that it needs to mark every other packet. If the packets are marked randomly with the desired probability (in this case 50%, or ½), then half of the previously unmarked packets are marked. Since the previously marked packets are not remarked, the combined amount of marked packets over the two links is 75% instead of the desired 50%. Notably, while this example assumes random marking, if the marking is deterministic, then every other packet is marked. Therefore, depending on the parity of the packets that are marked, either 100% of the traffic is marked, or 50% (the correct number). That is, if all even packets are marked on the first link and all odd packets are marked on the second link, 100% of the packets is marked (i.e., traffic flows are beat-down).

One enhancement to the above example is to account for the amount of traffic already marked, and to subsequently provide only incremental marking. For example, one could measure the overload of previously unmarked traffic only, and mark only the previously unmarked traffic based on this overload in proportion with the "unmarked overload." However, this enhancement does not fully solve the problem. For instance, consider the case as shown in FIG. 1 where a set of flows F1 traverses links A-B-C, a set of flows F2 traverses the link A-B and exit (to node D), and a set of flows F3 traverses the link B-C and exit (to node E). Assume that the rates of all sets of flows are equal, and that each link has 2× overload. (Note that the overload of a congested link may be computed with regard to a desired threshold rather than a maximum link speed, so in this example, a 2× overload may not cause packet loss at a first hop, e.g., node A, so a second hop, e.g., node B, will be equally overloaded.)

Assume further that the overload occurs when F1 is rerouted onto A-B-C due to a failure elsewhere in the network 100, but prior to that F2 and F3 load the corresponding links to the desired threshold, but without overloading the preemption capacity. After F1 has been rerouted, and assuming random marking, node A marks packets of F1 with a probability of ½, and packets of F2 with a probability of ½. Since F2 does not traverse link B-C, at the second point of congestion node B perceives on its input half of F1 packets marked, and initially no F3 packets marked. Assuming it correctly measures overload only of the previously unmarked traffic (that is, assuming the enhancement above has been applied), node B may conclude that it has 1.5×"unmarked" overload, and may therefore mark previously unmarked packets with a probability of ⅓. As a result, ⅓ of F3 is marked, and ⅓ of the unmarked F1 traffic (½ of F1) is marked.

The egress nodes of the network (e.g., nodes C, D, and E) then detect the 2× overload of F2, which leads to ½ of F2 traffic being preempted/dropped. Similarly, ⅓ of F3 is dropped and (½+⅓) or ⅚ of F1 is dropped, thus resulting in ⅙ of F1 remaining. Thus, utilization of link A-B is (½+⅙) or ⅔ of the desired threshold. Therefore, although link B-C is 100% utilized, the link A-B is not, which results in less transmitted traffic than could be allowed in this case. This problem can be made worse in a longer chain of congestion points, as each consequent congestion point in the chain will "beat down" the long-haul traffic further, accumulating underutilization on all of the links in the chain but the very last one.

Beat-Down Control Based on Overload Ratio

According to a first embodiment of the disclosure, a node determines an overload ratio ("OVERLOAD") for an output thereof as a ratio of a total rate of received traffic at the output to a preemption threshold of the output, and a ratio of traffic that is to be marked at the output ("NEED_RATIO") accordingly as 1-1/OVERLOAD. The node also determines a ratio of previously marked traffic destined for the output from each input feeding the output to the total traffic from each input to the output ("MARKED_RATIO"). If, for a particular input, MARKED_RATIO is less than NEED_RATIO, the node marks unmarked traffic of that particular input corresponding to a ratio substantially equal to the difference between NEED_RATIO and MARKED_RATIO for that particular input.

Figure 4:
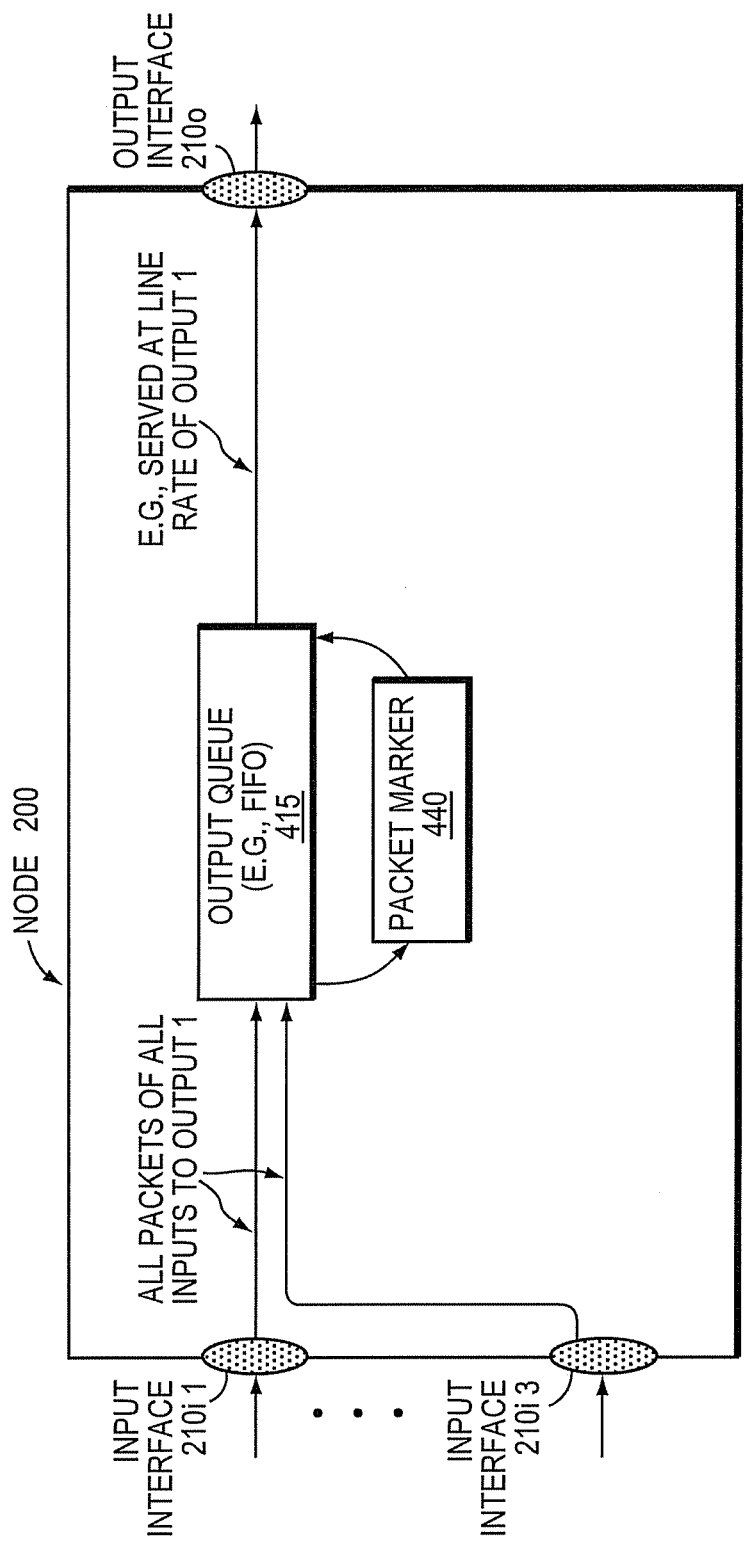
FIG. 4 illustrates an example network device/node.

FIG. 4 is a partial block diagram of an example node/router 200 illustrating various components and their interrelations. Node 200 may comprise one or more input interfaces 210$i$ and one or more output interfaces 210$o$, the latter illustratively labeled an "output 1" as shown. Traffic (e.g., packets 300 and 300') received on input interfaces 210$i$ from any flows that are destined to the same output interface 210$o$ (e.g., output 1) enters an output queue 415, e.g., a conventional first-in-first-out (FIFO) queue. Illustratively, assume the example above, where the node/router 200 is node B, which receives traffic from sets of flows corresponding to F1 (½ of it being marked) on input interface 210$i$1 (e.g., from node A) and F3 (none marked) on input interface 210$i$3 (e.g., from node D), where both inputs (sets of flows F1 and F3) are destined to node C via output 1 (210$o$).

The output queue 415 may be served at an output line rate (e.g., maximum physical rate of traffic that can be sent out the output interface 210$o$), or at another configurable rate. In addition, a configurable rate may be used at the output interface intended to limit the amount of traffic (possibly of a particular traffic class) to a rate less than the service rate of the queue, such as, e.g., a preemption rate. Notably, by using a preemption rate, traffic flow may be controlled prior to exceeding the physical limits of the node (e.g., the output interface), (or prior to overflowing the queue served at some rate smaller than the physical rate of the interface), thus resulting in fewer dropped/lost packets, as will be understood by those skilled in the art. For example, a preemption rate ("PREEMPTION") of output 1 may be configured as 100 bits per second (bps), which means that any traffic (packets) received at a rate greater than 100 bps should be marked. The overload ratio (OVERLOAD) of a particular output may be determined as the total rate of traffic received at an output (e.g., at output queue 415) divided by the preemption rate. For instance, if F1 and F3 both transmit 100 bps (100+100=200 bps "TOTAL"), and the preemption rate is 100 bps, then the corresponding output (output 1) has a 2× overload, or, equivalently, has OVERLOAD=2. The ratio of the traffic that needs to be removed at the output (NEED_RATIO) is the 1 minus the inverse of the OVERLOAD, i.e., in this example NEED_RATIO=1-1/OVERLOAD=½. Therefore, to remove the overload from output 1, ½ of the traffic leaving the output should be marked, e.g., ½ of 200 bps=100 bps. (Notably, other techniques for determining the amount of overload and the amount of packets that need to be marked will be understood by those skilled in the art, and the techniques described herein are merely examples.)

To determine the amount of traffic that needs to be marked at each input, the node 200 may determine a received rate of previously marked traffic on each of the input interfaces for a particular output (e.g., F1 and F3 for output 1), and may compute the corresponding MARKED_RATIO for each input. For instance, node B may determine that of the 100 bps received from sets of flows F1, ½ or 50 bps of that traffic (e.g., packets corresponding to 50 bps) are marked. This results in F1.MARKED_RATIO=½. Conversely, in the illustrative example, node B may determine that no traffic of F3 is marked accordingly, and so F3.MARKED_RATIO=0.

Additionally, in order to compute the rate of traffic that needs to be marked of input F1, node B multiplies the total rate of traffic at this input destined for the output (100 bps) by the (NEED_RATIO−F1.MARKED_RATIO). Since NEED_RATIO and F1.MARKED_RATIO are both ½, NEED_RATIO−F1.MARKED_RATIO=0 and therefore no additional traffic is marked of F1. For F3, F3.MARKED_RATIO=0, and therefore the total amount of traffic that is to be marked of F3 is equal to 100 bps times (NEED_RATIO−F3.MARKED_RATIO), which equals 100 bps times ½, or 50 bps. As a result, each of the sets of flows F1 and F3 contribute 50 bps of unmarked traffic to output 1, such that output 1 "sees" 100 bps of total traffic unmarked, which conforms to the preemption rate of 100 bps unmarked.

Figure 5:
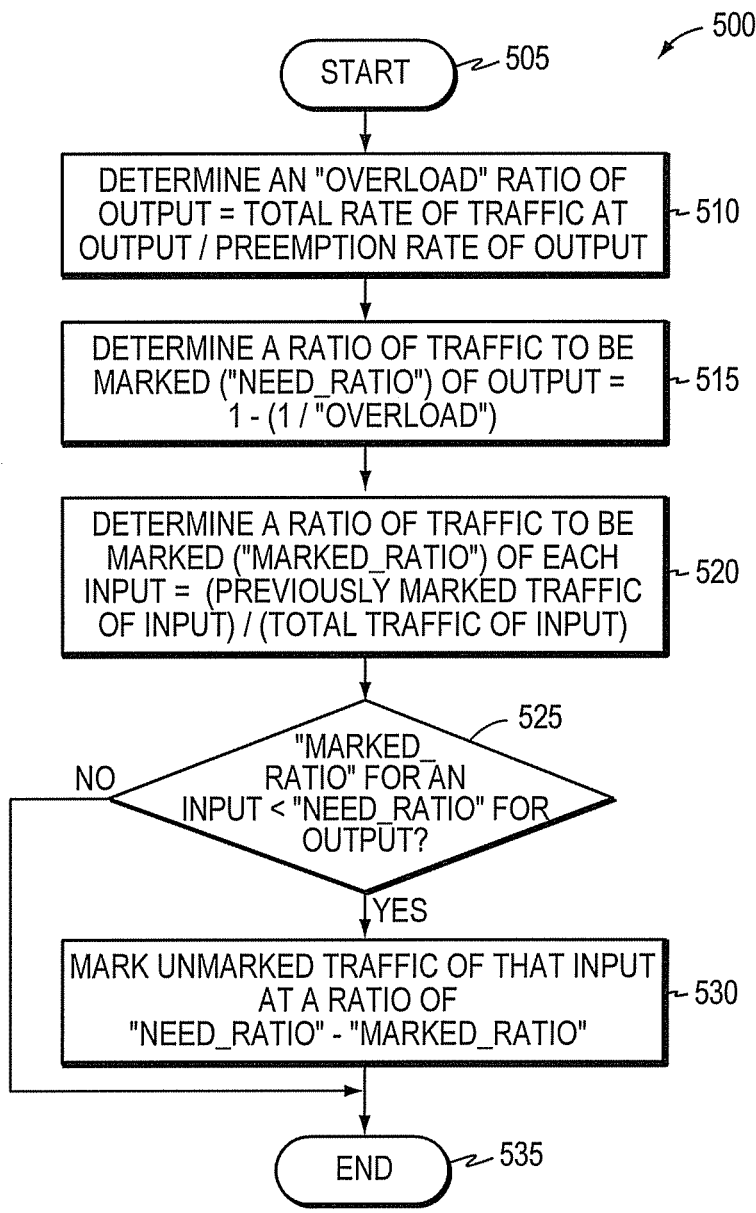
FIG. 5 illustrates an example procedure for beat-down control based on overload ratio.

FIG. 5 illustrates an example procedure for beat-down control in accordance with one or more embodiments described herein. The procedure 500 starts at step 505, and continues to step 510, where a node 200 (e.g., a core node B) determines an overload ratio (OVERLOAD) for an output (e.g., output 1, 210$o$) as a ratio of a total rate of received traffic (e.g., marked and unmarked packets 300/300') at the output to the preemption threshold of the output. In step 515, a ratio of traffic that is to be marked at the output (NEED_RATIO) accordingly as 1−1/OVERLOAD. The node also determines in step 520 a ratio of previously marked traffic destined for the output from each input feeding the output (e.g., flows F1 and F3 in input interfaces 210$i$) to the total traffic from each input to the output (MARKED_RATIO). If in step 525, for a particular input, MARKED_RATIO is less than NEED_RATIO, the node marks unmarked traffic of that particular input (step 530) corresponding to a ratio substantially equal to the difference between NEED_RATIO and MARKED_RATIO for that particular input. Notably, as described above, the rate of traffic that needs to be marked of an input is the total rate of traffic at the input destined for the output multiplied by the marking ratio (NEED_RATIO−MARKED_RATIO). The procedure 500 then ends in step 535. Notably, while the description for FIG. 5 is directed to a single input, those skilled in the art will appreciate that the same procedure 500 may be used for each input feeding the particular output accordingly. That is, after computing the NEED_RATIO in step 515, the node may perform the following steps 520-535 for each of its inputs feeding the output (i.e., to determine the ratio/rate of traffic to mark for each input).

While the embodiments/approaches described above solve the beat-down problem in many network situations, certain network situations may only have the beat-down problem reduced using the above techniques. For instance, the above embodiments remove underutilization of links due to multi-hop marking in the case where the rate of marked traffic for each input is less than the rate of traffic that needs to be marked for that input (i.e., where MARKED_RATIO for each input does not exceed NEED_RATIO for the output). In other words, the techniques described are particularly useful in the case where the current node (e.g., node B) is the bottleneck for traffic received for all of its inputs sharing a given output (e.g., a set of flows F1 or F3). However, in the event that some inputs already have a higher ratio of traffic marked than the NEED_RATIO at the output, while some inputs have smaller ratio of marked traffic than the NEED_RATIO at the output, the method described in the above embodiment does account for this "overmarking" at some inputs, and therefore does not allow the other inputs to be marked less, which would be desirable. To illustrate this, consider a simple example where two inputs F1 and F3 feed the same amount of traffic/packets to output 1, resulting in a 2× overload. If all traffic for F1 is previously marked (e.g., F1.MARKED_RATIO=1 as 100 bps out of 100 bps is marked), and none of F3 is marked (e.g., F3.MARKED_RATIO=0, as 0 bps out of 100 bps is marked), then a correct decision would be to not mark anything, since the output already meets the preemption rate or 100 bps. However, the above technique would still mark ½ of F3 (i.e., not accounting for the overmarking of F1), which may result in underutilization (beat-down) of the link B-C (e.g., only 50 bps transmitted on output 1).

Beat-Down Control with Accounting for Overmarking

According to a second embodiment of the disclosure, a node first determines a fair share of an output for one or more inputs that feed the output based on an overall preemption threshold of the output divided by a number of the inputs. The node also determines a rate of unmarked traffic that is received on each of the inputs, and further determines which inputs have a rate of unmarked traffic that is less than or equal to the fair share for the output ("constrained inputs"). In addition, the node determines which inputs have a rate of unmarked traffic that is greater than the fair share for the output ("unconstrained inputs"). The node may further determine remaining available bandwidth for all unconstrained inputs by subtracting a combined rate of unmarked traffic for each constrained input from the overall preemption threshold. From this, the node may determine a fair share use of the output for the unconstrained inputs ("unconstrained fair share") based on the remaining available bandwidth divided by a number of the remaining unconstrained inputs. The node may continue to perform iterations of this to determine additional constrained inputs based on updated unconstrained fair shares. If no more inputs have become unconstrained, the iterations complete. Otherwise, the node further determines a new remaining available bandwidth by subtracting the combined rate of unmarked traffic of all inputs that were determined to be constrained at this iteration from the previous value of the remaining available bandwidth, removing these constrained inputs from the set of unconstrained inputs, and repeating the new iteration of the computation of the unconstrained fair share of the updated remaining available bandwidth for the remaining unconstrained inputs. Once the iterations are complete, the node may then mark unmarked traffic of each unconstrained input at a rate substantially equal to the rate of unmarked traffic greater than the unconstrained fair share. No additional marking is needed for all inputs that have been determined to be constrained.

Illustratively, assume the situation described above where node B receives 100 (of 100) bps (denoted F1.MARKED) and 0 (of 100) bps (denoted F3.MARKED). Initially, all inputs may be considered "unconstrained", and the set of all unconstrained inputs is UNCONSTRAINED_SET. Therefore initially "UNCONSTRAINED_SET" contains all of all the inputs feeding traffic to output 1 (again, with a preemption rate denoted as PREEMPTION). The node 200 (node B) determines the number of all inputs in the UNCONSTRAINED_SET ("UNCONSTRAINED_NUMBER"). Initially, an "AVAILABLE" rate at the output is set to the total PREEMPTION rate. Using the preemption rate and the number of all inputs feeding the output, the node may determine a "fair share estimate" or "fair share use" ("UNCONSTRAINED_FAIR") for each of the inputs in the set (SET) of inputs feeding the output as AVAILABLE/UNCONSTRAINED_NUMBER. In other words, the node determines the rate of unmarked traffic each input should fairly contribute to the output before the preemption rate is exceeded (i.e., AVAILABLE/UNCONSTRAINED_NUMBER=UNCONSTRAINED_FAIR). For example, assuming PREEMPTION equal 100 bps, and there are only two inputs feeding the output, initially the UNCONSTRAINED_SET contains two inputs, e.g., F1 and F3), each input's fair share (i.e., each input's UNCONSTRAINED_FAIR) would be 100 bps/2, or 50 bps of unmarked traffic.

The node 200 (e.g., node B) also determines an UNMARKED traffic rate for each input, and further determines which inputs have an UNMARKED traffic rate that is less than or equal to UNCONSTRAINED_FAIR. These inputs are "constrained inputs" in that traffic on these inputs is already marked more than its fair share of this output (or the total unmarked traffic rate is below its fair share), and therefore traffic from this input for this output should not be further marked at this node. For example, inputs from the set of flows F1 have 0 bps of unmarked traffic (0/100 bps F1.UNMARKED). As such, F1 is considered a constrained input. In addition, node B determines which inputs have an UNMARKED that is greater than UNCONSTRAINED_FAIR. These remaining inputs are "unconstrained inputs" in that traffic on these inputs is marked less than determined by its fair share, and therefore additional traffic of these inputs may need to be marked. For example, inputs from the set of flows F3 contribute 100 bps of unmarked traffic (100 of 100 bps F3.UNMARKED), and is thus considered an unconstrained input.

Once the inputs have been identified as constrained or unconstrained, the node 200 may determine a modified (updated) remaining AVAILABLE rate for all unconstrained inputs by subtracting the combined unmarked rates of all constrained inputs from the previous AVAILABLE value. That is, assuming the constrained inputs are marking more packets than necessary (using less than their fair share of unmarked traffic), the remaining unconstrained inputs may divide a greater amount of the preemption threshold among themselves. Or, said differently, if some inputs do not have enough traffic to sustain their fair share, the other inputs may use more than the current estimate of the fair share. For instance, by subtracting a combined amount of unmarked packets for each constrained input from the overall preemption threshold, e.g., AVAILABLE−F1.UNMARKED, the remaining preemption threshold for the remaining inputs may be calculated. For example, the new value AVAILABLE=100 bps−0 bps=100 bps. Further, the node may update UNCONSTRAINED SET by removing F1 from the previous UNCONSTRAINED_SET (leaving just F3 in the UNCONSTRAINED SET in the considered example), and may further update UNCONSTRAINED_NUMBER by subtracting 1 (the number of constrained inputs) from the previous value of UNCONSTRAINED NUMBER. Therefore, the remaining unconstrained inputs (e.g., F3) may share up to the remaining AVAILABLE bandwidth at the output, e.g., 100 bps. From this, the node 200 may determine an updated fair share of the output for the remaining unconstrained inputs (UNCONSTRAINED_FAIR) based on the new AVAILABLE value divided by the new number of the unconstrained inputs ("UNCONSTRAINED_NUMBER"). That is, UNCONSTRAINED_FAIR=AVAILABLE/UNCONSTRAINED_NUMBER. In the example described herein, F3's unconstrained fair share is 100 bps/1, or 100 bps. The node 200 therefore determines that no additional traffic needs to be marked for all constrained inputs, and may then compute a further revised fair share of the unconstrained inputs. Put another way, in the two-input example above, node B marks unmarked traffic 300 of unconstrained input F3 at a rate equal to (F3.UNMARKED−UNCONSTRAINED_FAIR), or (100 bps-100 bps), i.e., no traffic.

In this example with only two input interfaces, two iterations of the computation of the UNCONSTRAINED_FAIR were necessary to compute the correct fair shares. If more that two interfaces are involved, more iterations may be necessary for the node 200 to compute fair allocation of the output bandwidth for all inputs. For instance, after the UNCONSTRAINED_FAIR rate is computed at some iteration, some of the previously unconstrained inputs may become constrained with respect to the new UNCONSTRAINED_FAIR computed in the previous iteration. Therefore, an input that was classified as "unconstrained" before the computation of UNCONSTRAINED_FAIR may become constrained after this computation (but once an input is classified as constrained, it remains constrained). In this case the inputs that are newly classified as "constrained" are not marked any further at this node, and the new iteration of computation of UNCONSTRAINED_FAIR rates is performed by reducing the AVAILABLE value further by the total unmarked rate of all inputs classified as constrained at this iteration, and further dividing it by the remaining number of unconstrained inputs. The iterations may continue until there are no further constrained inputs. When no further constrained inputs remain after a new computation of UNCONSTRAINED_FAIR, all inputs which remain unconstrained are assigned the newly computed UNCONSTRAINED_FAIR rate. Therefore, a complete process for computing the fair rates may take at most N iterations, where N is the number of inputs feeding the output. Notably, a single iteration may determine (and remove) multiple constrained inputs accordingly. Moreover, an implementation may also choose to run all the iterations necessary or stop after a pre-defined number of iterations (e.g., 2-4 iterations).

When the iterations are completed, the node 200 will have determined the fair share for all unconstrained inputs, and can then determine the additional marking rates for all inputs as the total unmarked traffic at an unconstrained input minus its computed UNCONSTRAINED_FAIR share, and will accordingly mark unmarked traffic of each unconstrained input (e.g., using packet marker 440 in conjunction with flow control process/services 245). Illustratively, rather than the two inputs F1 and F3 above, assume now that a node 200 has four sets of flows corresponding to F4, F5, F6, and F7 on four inputs (not shown) that each feed a single output (the SET, S). Further assume the scenario given below, where each input feeds 30 bps total, and:

F4 feeds 20 bps MARKED, 10 bps UNMARKED;
F5 feeds 8 bps MARKED, 22 bps UNMARKED;
F6 feeds 0 bps MARKED, 30 bps UNMARKED;
F7 feeds 0 bps MARKED, 30 bps UNMARKED; and
PREEMPTION_for the output is 80 bps.

As described above, initially AVAILABLE=PREEMPTION, UNCONSTRAINED_SET={F4, F5, F6 and F7}, and UNCONSTRAINED_NUMBER=4. From this information, the node can determine the initial UNCONSTINED_FAIR=AVAILABLE/UNCONSTRAINED_NUMBER=80 bps/4=20 bps. Now, the node may determine that F4 has an UNMARKED that is less than UNCONSTAINED_FAIR, i.e., 10 bps≦20 bps, so F4 is classified as constrained. F4's fair share is set to its UNMARKED (i.e., no packets will be further marked of F4), and F4 is then removed from the UNCONSTRAINED_SET, and the number of unconstrained interfaces UNCONSTRAINED_NUMBER is reduced by 1 (i.e., now UNCONSTRAINED_NUMBER=3). Further modified AVAILABLE may be computed as the original AVAILABLE (80 bps) less F4's fair share (F4.UNMARKED, 10 bps), which is 70 bps. Again, a UNCONSTRAINED_FAIR value is computed as AVAILABLE/UNCONSTRAINED_NUMBER=70 bps/3, which equals 23⅓ bps. F5 has 20 bps UNMARKED which is less than 23⅓ bps, so F5, which was unconstrained in the first iteration, now becomes constrained, and again has its fair share set to its own UNMARKED, and the new AVAILABLE value and the UNCONSTRAINED_SET and the value UNCONSTRAINED_NUMBER of the inputs in the unconstrained set are updated to reflect F5's removal from the unconstrained set. After F5 was removed from the UNCONSTRAINED_SET, the new AVAILABLE=48 bps and the new UNCONSTRAINED_NUMBER=2. Thus, the new UNCONSTRAINED_FAIR=24 bps (48 bps/2). Because neither F6 nor F7 have an UNMARKED less than 24 bps, each of F6 and F7 is declared to be unconstrained inputs and no new unconstrained inputs are found. Therefore, no further iterations are needed, and both F6 and F7, then, are assigned the current UNCONSTRAINED_FAIR=24, and accordingly should be marked such that each only transmits 24 bps of unmarked traffic onto the output. (Notably, in this case, the combination of each of F4+F5+F6+F7.UNMARKED=10+22+24+24=80 bps, the original PREEMPTION.) The amount of traffic that each of F6 and F7 need to additionally mark is determined UNMARKED−24 bps for each unconstrained input (or UNMARKED minus the UNCONTRAINED FAIR computed at the last iteration. For example, for F6 (and F7), (30 bps−24 bps)=6 bps.

Again, then, an efficient rate of traffic (e.g., number of packets 300) has been marked using this illustrative step-by-step technique to reduce the beat-down problem in many network situations, particularly where certain inputs have been overmarked. Those skilled in the art will understand that the illustrative steps described above achieve generally the same results as the broader description above of embodiments that account for overmarking (e.g., according to the general discussion above with regard to F1 and F3).

Figure 6:
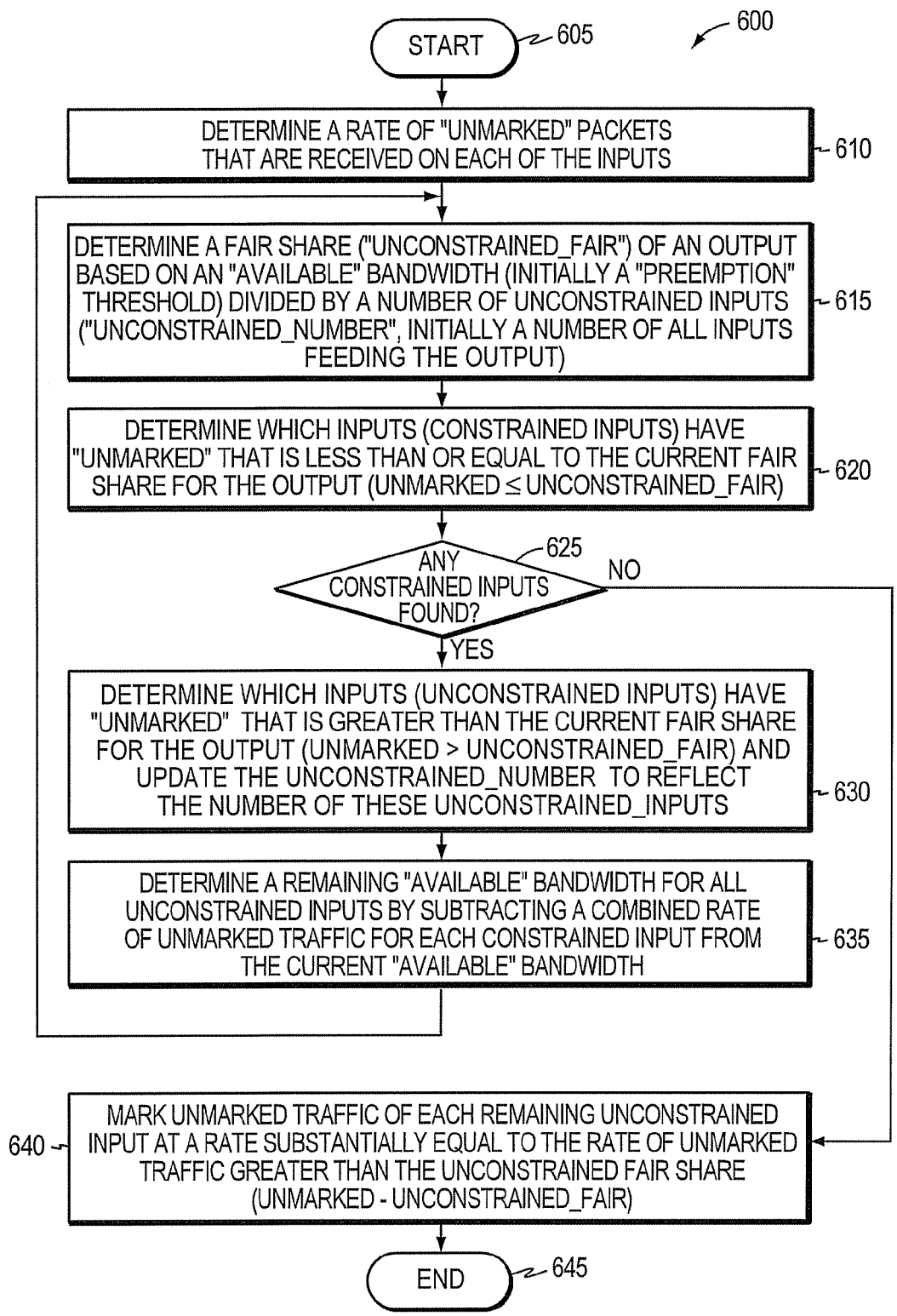
FIG. 6 illustrates an example procedure for beat-down control based on fair rate computation.

FIG. 6 illustrates an example procedure for beat-down control for each output (e.g., accounting for overmarking) in accordance with one or more embodiments described herein. The procedure 600 starts at step 605, and continues to step 610, where a node 200 (e.g., a core node B) determines a rate of unmarked traffic (e.g., UNMARKED) that is received on each of one or more inputs 210i that feed an output 210o. In step 615, the node may determine a fair share (e.g., UNCONSTRAINED_FAIR) of the output based on an AVAILABLE bandwidth (initially a preemption threshold PREEMPTION of the output for the first iteration) divided by a number of unconstrained inputs (e.g., denoted as UNCONSTRAINED_NUMBER, which is initially a number of all inputs feeding the output). For instance, the traffic may be received from one or more input flows (e.g., input flows from F1 and F3), for example on or more input interfaces 210i, as described above. In step 620, the node may further determine which inputs (constrained inputs) 210i have a rate of unmarked traffic that is less than or equal to the current fair share for the output (i.e., where UNMARKED≦UNCONSTRAINED_FAIR). If there are any constrained inputs found in step 620 (as determined in step 625), the node continues the iteration to step 630, where the node may determine which inputs (unconstrained inputs)

have a rate of unmarked traffic (UNMARKED) that is greater than the current fair share for the output (i.e., where UNMARKED>UNCONSTRAINED_FAIR). Also in step 630, the node updates the UNCONSTRAINED_NUMBER to reflect the number of these unconstrained inputs.

In step 635, the node 200 may determine a remaining available bandwidth (AVAILABLE) for all unconstrained inputs by subtracting a combined rate of unmarked traffic for each constrained input from the overall preemption threshold, i.e., remaining AVAILABLE=previous AVAILABLE−(constrained UNMARKED 1+constrained UNMARKED 2+ . . . constrained UNMARKED N). As described above, the node may then perform iterations returning to step 615 to determine additional constrained inputs based on iterative AVAILABLE, UNCONSTRAINED_FAIR, and UNCONSTRAINED_NUMBER values until the iterations are complete in step 625 (e.g., until no more inputs are found to be constrained or until a configured number of iterations has been performed). The node may then mark unmarked traffic of each remaining unconstrained input in step 640 at a rate substantially equal to the rate of unmarked traffic greater than the unconstrained fair share, i.e., UNMARKED−UNCONSTRAINED_FAIR. The procedure 600 then ends in step 645.

Accordingly, as described herein, an efficient rate of traffic (e.g., number of packets 300) has been marked using this technique to reduce the beat-down problem in many network situations. In particular, this second approach results in local max-min fair computation and avoids accumulation of feedback over multiple hops, as each aggregate traffic "flow" following a particular route maintains the amount of unmarked traffic equal to its bottleneck max-min fair share along the route. That is, the point at which the greatest rate reduction occurs is the maximum rate reduction along the entire flow path.

In accordance with one or more embodiments described herein, the first approach (not accounting for overmarking) may be modified according to the second approach, such that the node 200 determines the ratio of received traffic at an output that needs to be marked based on a rate of overmarking of one or more of the inputs 210*i*. For instance, the node 200 in the first approach may mark unmarked traffic of an input transmitting greater than its fair share (e.g., F3 above) at a ratio substantially equal to the ratio of traffic that needs to be marked minus the ratio of marked traffic, where the ratios consider the rate of all overmarked traffic of one or more other inputs. In other words, while the first embodiment described herein describes ratios, and second describes rates, the two embodiments may be combined accordingly, as will be appreciated by those skilled in the art.

In addition, in accordance with embodiments described herein (e.g., each embodiment described above), the traffic (i.e., marked packets 300' and unmarked packets 300) from the sets of flows (e.g., F1 and F3) reach an egress node of the network 100 (e.g., node C and node E, respectively). The egress(es) may be configured to determine (decide) which flows in particular to preempt of each set of flows (e.g., specific flows of F1 or F3) based on the packet markings of the traffic to reduce network congestion, and may send this feedback to the appropriate ingress nodes (e.g., node A and node D, respectively). Alternatively, the egress(es) may simply inform the appropriate ingress(es) of the packet markings (e.g., ratios, values, etc.), and the ingress(es) may decide which flows to preempt. In either case, each set of flows, then, may have a certain number of particular flows preempted that reduces network congestion without beating down the number of flows beyond what may be necessary. Notably, which flows to preempt may be a local decision to the deciding node (egress/ingress), and may be based on a number of factors, e.g., random selection, older/newer flows, larger/smaller flows, higher/lower priority flows, etc.

Figure 7:
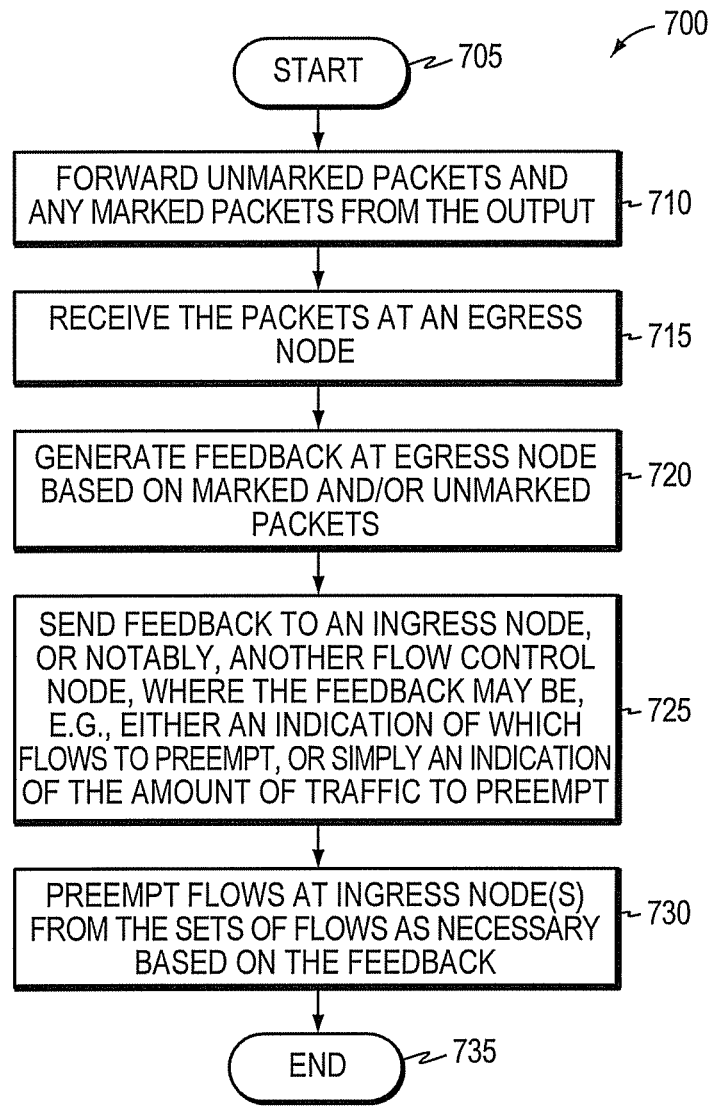
FIG. 7 illustrates an example procedure for flow control feedback.

FIG. 7 illustrates an example procedure for flow control feedback in accordance with one or more embodiments described herein. The procedure 700 starts at step 705, and continues to step 710, where the unmarked packets 300 and any marked packets 300' are forwarded from the output 210*o*, and an egress node (e.g., node C) receives the packets at step 715 and generates feedback based on marked and/or unmarked packets as described above. In step 720, the feedback is sent to an ingress node (e.g., node A for F1 and node D for F3), or notably, another flow control node, where the feedback may be, e.g., either an indication of which flows to preempt, or simply an indication of the amount of traffic to preempt, as mentioned above. The ingress node(s) may then preempt flows from the sets of flows as necessary in step 725 based on the feedback. The procedure 700 then ends in step 730. Notably, while the procedure illustratively ends for the packets forwarded in step 710, the procedure 700 continues to maintain and update the feedback based on packets continually forwarded from the node 200 at step 710.

Moreover, in accordance with one or more embodiments described herein, it may be beneficial to configure the nodes of the network to preferentially drop marked packets 300' prior to dropping unmarked packets 300 in the event a packet must be dropped (e.g., due to exceeding physical limitations of the node). For instance, if packets are dropped regardless of their marking, the techniques described herein may become less effective. Therefore, by dropping marked packets before unmarked packets, the general integrity of these techniques may be maintained. Alternatively, one or more embodiments described herein may be adjusted to drop all packets that are to be marked, thus removing the need to distinguish between marked and unmarked packets. While this may, on occasion, result in too many dropped packets until the feedback is received to adjust flows, this temporary packet-based beat-down may be acceptable in certain circumstances.

Advantageously, the novel techniques described herein control preemption-based beat-down problems in a computer network. By determining the rate of previously marked traffic, and applying that determination to the algorithms described herein, the novel techniques approximate traffic (e.g., packet) marking based on max-min fair allocation on a per-input basis, thus reducing or eliminating the beat-down problem. Also, the dynamic aspects of one or more embodiments described herein alleviate the need for cumbersome and inefficient manual configuration.

While there have been shown and described illustrative embodiments that control preemption-based beat-down problems in a computer network, it is to be understood that various other adaptations and modifications may be made within the spirit and scope of the present invention. For example, the embodiments have been shown and described herein with reference to a network of core routers. However, the embodiments of the invention in its broader sense are not so limited, and may, in fact, be used with any set of nodes/routes involved with flow control, as will be understood by those skilled in the art. Also, while various received traffic rates (e.g., marked, unmarked, need to be marked, need to pass through unmarked, etc.) are shown and described herein, those skilled in the art will understand that other values representing essentially the same information may be used accordingly. For instance, reciprocal values may be interchangeably used, such as, for example, rather than using a rate of marked traffic, a reversed logic algorithm could be applied to a rate of unmarked traffic (i.e., 1—the rate of marked traffic), as will be understood by those skilled in the art. Accordingly, where one value is shown and described herein, that value is merely a representative example for illustration, and other substantially similar means of achieving the same result are within the scope of the present invention.

The foregoing description has been directed to specific embodiments of this invention. It will be apparent, however, that other variations and modifications may be made to the described embodiments, with the attainment of some or all of their advantages. For instance, it is expressly contemplated that the components and/or elements described herein can be implemented as software, including a computer-readable medium having program instructions executing on a computer, hardware, firmware, or a combination thereof. Also, electromagnetic signals may be generated to carry computer executable instructions that implement aspects of the present invention over, e.g., a wireless data link or a data network, such as the Internet. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method comprising:
   determining an overload ratio for an output of a node in a computer network as a ratio of a total rate of received traffic at the output to a preemption threshold of the output;
   determining a ratio of traffic that is to be marked at the output based on the overload ratio;
   determining, for each of one or more inputs, a ratio of previously marked traffic destined for the output from a respective input feeding the output to the total traffic from the respective input to the output;
   determining whether, for a particular input, the ratio of previously marked traffic destined for the output from the particular input is less than the ratio of traffic that is to be marked at the output; and
   if so, marking, by the node of the computer network, unmarked traffic of the particular input corresponding to a ratio substantially equal to a difference between the ratio of traffic that is to be marked at the output and the ratio of previously marked traffic destined for the output from the particular input.

2. The method as in claim 1, further comprising:
   computing a rate of traffic that needs to be marked for the particular input as a total rate of traffic at the particular input destined for the output multiplied by a ratio for marking unmarked traffic of the particular input.

3. The method as in claim 1, further comprising:
   determining, for the particular input, that the ratio of previously marked traffic destined for the output from the particular input is greater than the ratio of traffic that is to be marked at the output; and, in response
   allowing unmarked traffic of the particular input to remain unmarked.

4. The method as in claim 1, further comprising:
   forwarding traffic from one or more output interfaces;
   receiving the traffic at an egress node; and
   deciding, at the egress node, which input flows to preempt based on markings of the received traffic.

5. The method as in claim 4, further comprising:
   sending a list of the input flows to preempt to a flow control node.

6. The method as in claim 1, further comprising:
   forwarding traffic from one or more output interfaces;
   receiving the traffic at an egress node; and
   generating feedback at the egress node based on markings of the received traffic.

7. The method as in claim 6, further comprising:
   sending the feedback to a flow control node; and
   deciding, at the flow control node, which input flows to preempt based on the feedback.

8. The method as in claim 7, wherein the step of sending the feedback to the flow control node comprises sending the feedback to an ingress node.

9. The method as in claim 1, further comprising:
   determining the ratio for marking unmarked traffic of the particular input based on an overmarking of one or more inputs feeding the output.

10. The method as in claim 1, wherein the determining a ratio of traffic that is to be marked at the output based on the overload ratio further comprises subtracting an inverse of the overload ratio from one.

11. An apparatus comprising:
    one or more input interfaces adapted to receive traffic from one or more input flows;
    an output interface;
    one or more processors configured to execute one or more software processes; and
    a memory configured to store a flow control process executable on at least one of the one or more processors, the flow control process when executed operable to:
      determine an overload ratio for the output interface as a ratio of a total rate of received traffic at the output interface to a preemption threshold of the output interface,
      determine a ratio of traffic that is to be marked at the output interface based on the overload ratio,
      determine, for each of one or more input interfaces, a ratio of previously marked traffic destined for the output interface from a respective input interface feeding the output interface to the total traffic from each the respective input interface to the output interface,
      determine whether, for a particular input interface, the ratio of previously marked traffic destined for the output interface from the particular input interface is less than the ratio of traffic that is to be marked at the output interface, and
      if so, mark unmarked traffic of the particular input interface corresponding to a ratio substantially equal to a difference between the ratio of traffic that is to be marked at the output interface and the ratio of previously marked traffic destined for the output interface from the particular input interface.

12. The apparatus as in claim 11, wherein the flow control process when executed is further operable to:
    compute a rate of traffic that needs to be marked for the particular input interface as a total rate of traffic at the particular input interface destined for the output interface multiplied by a ratio for marking unmarked traffic of the particular input interface.

13. The apparatus as in claim 11, wherein the flow control process when executed is further operable to:
    determine, for the particular input interface, that the ratio of previously marked traffic destined for the output interface from the particular input interface is greater than the ratio of traffic that is to be marked at the output interface, and, in response
    allow unmarked traffic of the particular input interface to remain unmarked.

14. The apparatus as in claim 11, wherein the flow control process when executed is further operable to:
    forward traffic from the output interface.

15. The apparatus as in claim 11, wherein the flow control process when executed is further operable to:
   determine the ratio for marking unmarked traffic of the particular input interface based on an overmarking of one or more input interfaces feeding the output interface.

16. The apparatus as in claim 11, wherein the flow control process when executed is operable to:
   determine the ratio of traffic that is to be marked at the output based on the overload ratio by subtraction of an inverse of the overload ratio from one.

17. An apparatus comprising:
   a processor;
   means for determining an overload ratio for an output of a node in a computer network as a ratio of a total rate of received traffic at the output to a preemption threshold of the output;
   means for determining a ratio of traffic that is to be marked at the output based on the overload ratio;
   means for determining, for each of one or more inputs, a ratio of previously marked traffic destined for the output from a respective input feeding the output to the total traffic from the respective input to the output;
   means for determining that, for a particular input, the ratio of previously marked traffic destined for the output from the particular input is less than the ratio of traffic that is to be marked at the output; and
   means for marking, by the node of the computer network, unmarked traffic of the particular input corresponding to a ratio substantially equal to a difference between the ratio of traffic that is to be marked at the output and the ratio of previously marked traffic destined for the output from the particular input.

18. The apparatus as in claim 17, further comprising:
   means for computing a rate of traffic that needs to be marked for the particular input as a total rate of traffic at the particular input destined for the output multiplied by a ratio for marking unmarked traffic of the particular input.

19. The apparatus as in claim 17, further comprising:
   means for determining, for the particular input interface, that the ratio of previously marked traffic destined for the output from the particular input is greater than the ratio of traffic that is to be marked at the output; and
   means for allowing unmarked traffic of the particular input to remain unmarked provided that the ratio of previously marked traffic destined for the output from a particular input is greater than the ratio of traffic that is to be marked at the output.

20. The apparatus as in claim 17, wherein the means for determining a ratio of traffic that is to be marked at the output based on the overload ratio is configured to determine the ratio for marking unmarked traffic of the particular input by subtraction of an inverse of the overload ratio from one.

* * * * *

UNITED STATES PATENT AND TRADEMARK OFFICE
CERTIFICATE OF CORRECTION

| | | |
|---|---|---|
| PATENT NO. | : 8,437,253 B2 | Page 1 of 1 |
| APPLICATION NO. | : 12/791476 | |
| DATED | : May 7, 2013 | |
| INVENTOR(S) | : Anna Charny et al. | |

It is certified that error appears in the above-identified patent and that said Letters Patent is hereby corrected as shown below:

In the Specifications:

In col. 2, line 3 should read:
Resource Management in ~~DiffSery~~ DiffServ (RMD) concept in an In col. 2, line 5 should read:
*Resource Management in ~~DiffSery~~ DiffServ QOS Model*<draft-ietf- In col. 2, line 31 should read:
~~is~~ the context of preemption (dropping/denying entire flows), In col. 2, line 66 should read:
that is to be ~~is~~ marked at the output ("NEED_RATIO")

In the Claims:

In col. 16, line 37 should read:
~~each~~ the respective input interface to the output inter- Signed and Sealed this
Twenty-fifth Day of June, 2013

Teresa Stanek Rea
*Acting Director of the United States Patent and Trademark Office*